(12) United States Patent
Chen

(10) Patent No.: US 9,545,701 B2
(45) Date of Patent: Jan. 17, 2017

(54) FAN SCREW NUT FOR REMOVING SCRAPS

(71) Applicant: Ching-Ting Chen, Taichung (TW)

(72) Inventor: Ching-Ting Chen, Taichung (TW)

( * ) Notice: Subject to any disclaimer, the term of this patent is extended or adjusted under 35 U.S.C. 154(b) by 324 days.

(21) Appl. No.: 14/515,796

(22) Filed: Oct. 16, 2014

(65) Prior Publication Data

US 2016/0107282 A1  Apr. 21, 2016

(51) Int. Cl.
| | |
|---|---|
| *B23Q 11/00* | (2006.01) |
| *F04D 17/16* | (2006.01) |
| *F04D 29/60* | (2006.01) |
| *B23B 31/02* | (2006.01) |
| *B23B 31/20* | (2006.01) |

(52) U.S. Cl.
CPC ............ *B23Q 11/005* (2013.01); *B23B 31/02* (2013.01); *B23B 31/20* (2013.01); *F04D 17/16* (2013.01); *F04D 29/601* (2013.01); *B23B 2260/106* (2013.01); *B23B 2270/30* (2013.01)

(58) Field of Classification Search
CPC ........ F04D 17/16; F04D 29/70; F04D 29/701; F04D 29/703; F04D 29/601; B23Q 11/005; B23B 31/02; B23B 31/20; B23B 47/34
USPC ........ 408/67, 56; 409/134–137, 182; 416/60
See application file for complete search history.

(56) References Cited

U.S. PATENT DOCUMENTS 8,696,271 B2 *  4/2014  Dickey .................. B23B 31/02
                                                            408/67

\* cited by examiner

*Primary Examiner* — Richard Edgar
(74) *Attorney, Agent, or Firm* — Birch, Stewart, Kolasch & Birch, LLP

(57) ABSTRACT

The fan screw nut for removing scraps includes a screwing hub, multiple fan blades and a frame. The screwing hub has an outer periphery. The fan blades are spiral in shaped and are formed around the outer periphery of the screwing hub. A flux space is formed between each fan blade. The frame is formed integratedly on an outer periphery of a front side of the fan blades. Multiple through holes are formed between the inner side of the frame and the flux spaces for air flowing. The fan screw can be introduced air into flux space via through holes to blow up scraps that generated from cutting a work piece.

20 Claims, 9 Drawing Sheets

FAN SCREW NUT FOR REMOVING SCRAPS

BACKGROUND OF THE INVENTION

1. Field of the Invention

The present invention relates to a screw nut, and more particularly to a fan screw nut for removing scraps.

2. Description of Related Art

A conventional tool holder is connected with a cutting tool by a sleeve mounted in a front end of the tool holder, the cutting tool is inserted in the sleeve and a screw nut is mounted around the sleeve to clamp or release the sleeve by rotating. After the cutting tool cut a work piece, scraps are generated and disposed on a top surface of the work piece, which may affect the precision of cutting the work piece. The conventional way of cleaning the scraps is to wash the top surface of the work piece by cutting fluid, but the cleaning effect of the conventional way is not good enough.

To overcome the shortcomings of the conventional cleaning way, the present invention provides a fan screw nut for removing scraps to mitigate or obviate the aforementioned problems.

SUMMARY OF THE INVENTION

In order to reach the said invention objective, the present invention provides a fan screw nut for removing scraps including a screwing hub, multiple fan blades and a frame. The screwing hub has an outer periphery. The fan blades are spiral in shaped and are formed around the outer periphery of the screwing hub. A flux space is formed between each fan blade. The frame is formed integratedly on an outer periphery of a front side of the fan blades. Multiple through holes are formed between the inner side of the frame and the flux spaces for air flowing.

The fan screw can be introduced air into flux space via through holes to blow up scraps that generated from cutting a work piece.

Other objects, advantages, and novel features of the invention will become more apparent from the following detailed description when taken in conjunction with the accompanying drawing.

DETAILED DESCRIPTION OF PREFERRED EMBODIMENT

Figure 1:
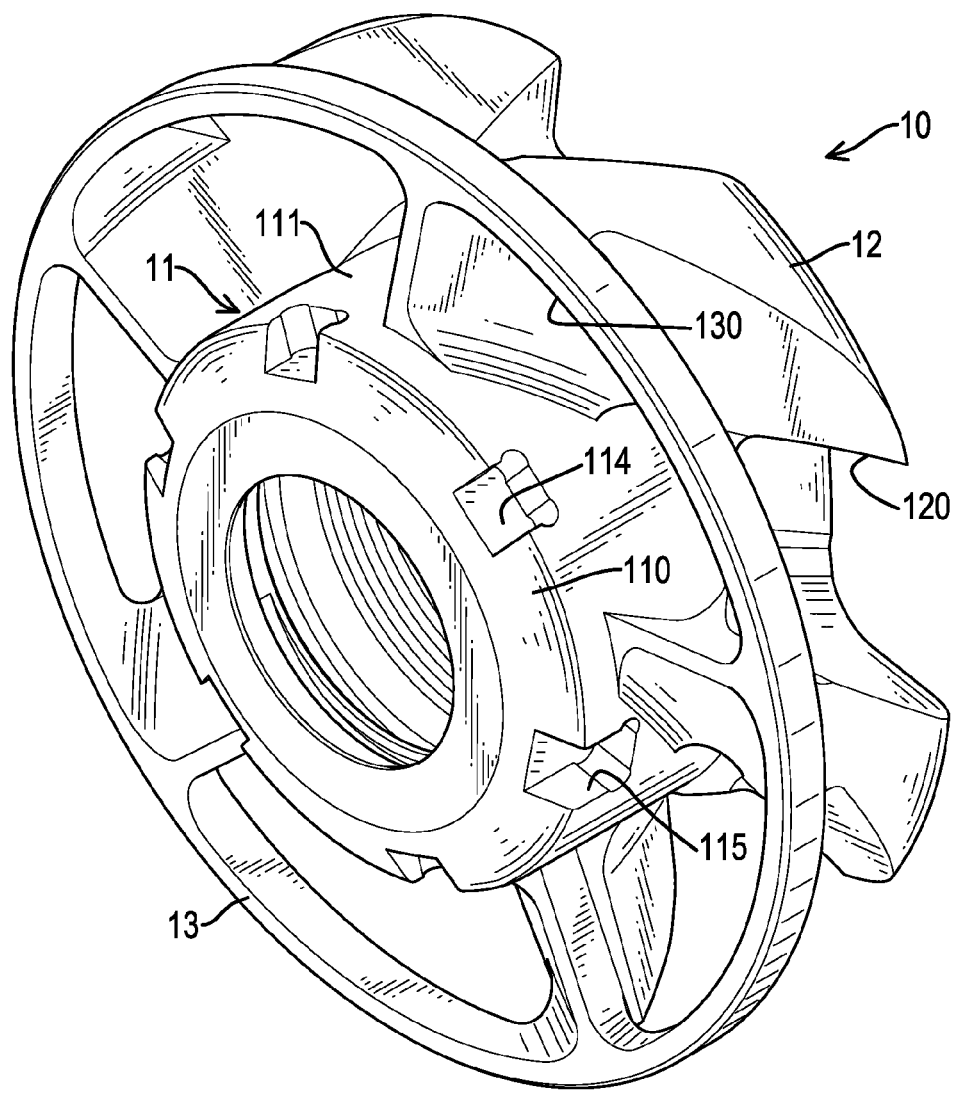
FIG. 1 is a perspective view of a first preferred embodiment of a fan screw nut in accordance with the present invention.
Figure 2:
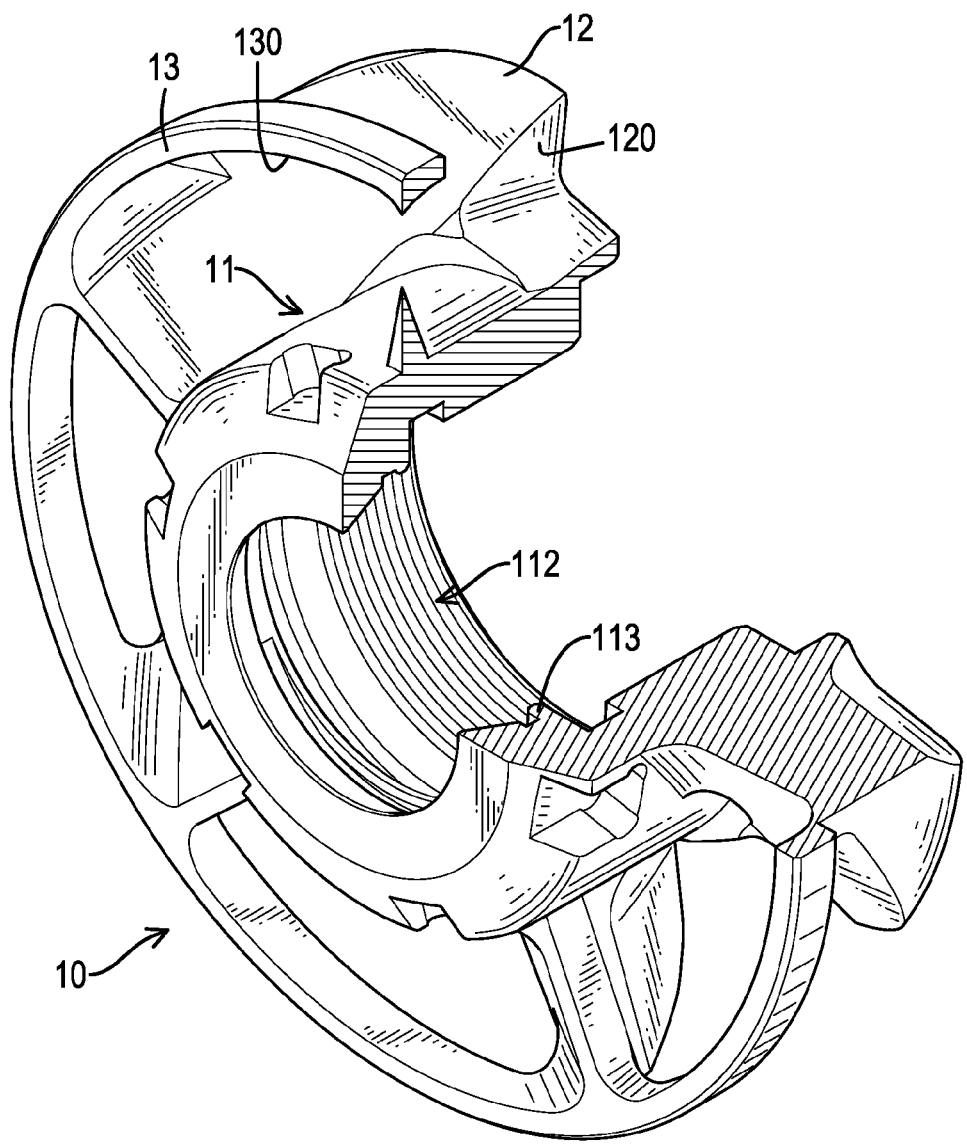
FIG. 2 is a perspective view in partial section of the fan screw nut in FIG. 1.

With reference to FIGS. 1 and 2, a first preferred embodiment of a fan screw nut 10 in accordance with the present invention includes a screwing hub 11, multiple fan blades 12 and a frame 13.

The screwing hub 11 is cylindrical and has a front surface 110, an outer periphery 111, an assembling hole 112, an engaging ring 113, multiple positioning holes 114 and a balancing hole 115. The assembling hole 112 is stepped, is formed in a center of the front surface 110 and is dividend as a clamping portion 1121 and a screwing portion 1122. The clamping portion 1121 is tapered in cross-section and is located adjacent to the front surface 110 for clamping a sleeve. The screwing portion 1122 has a thread formed in an inner surface of the assembling hole 112 for being fixed on a tool holder.

Figure 3:
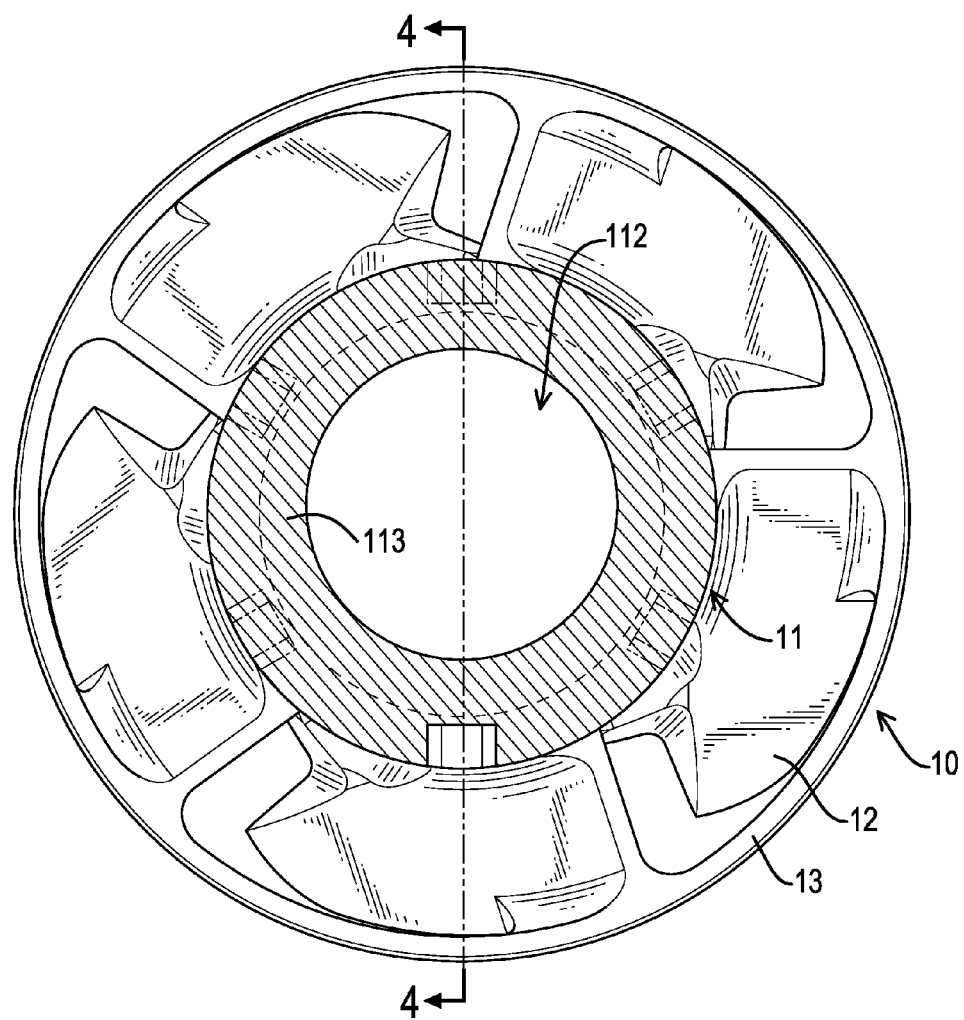
FIG. 3 is a cross sectional front view of the fan screw nut along the line 3-3 in FIG. 4.
Figure 4:
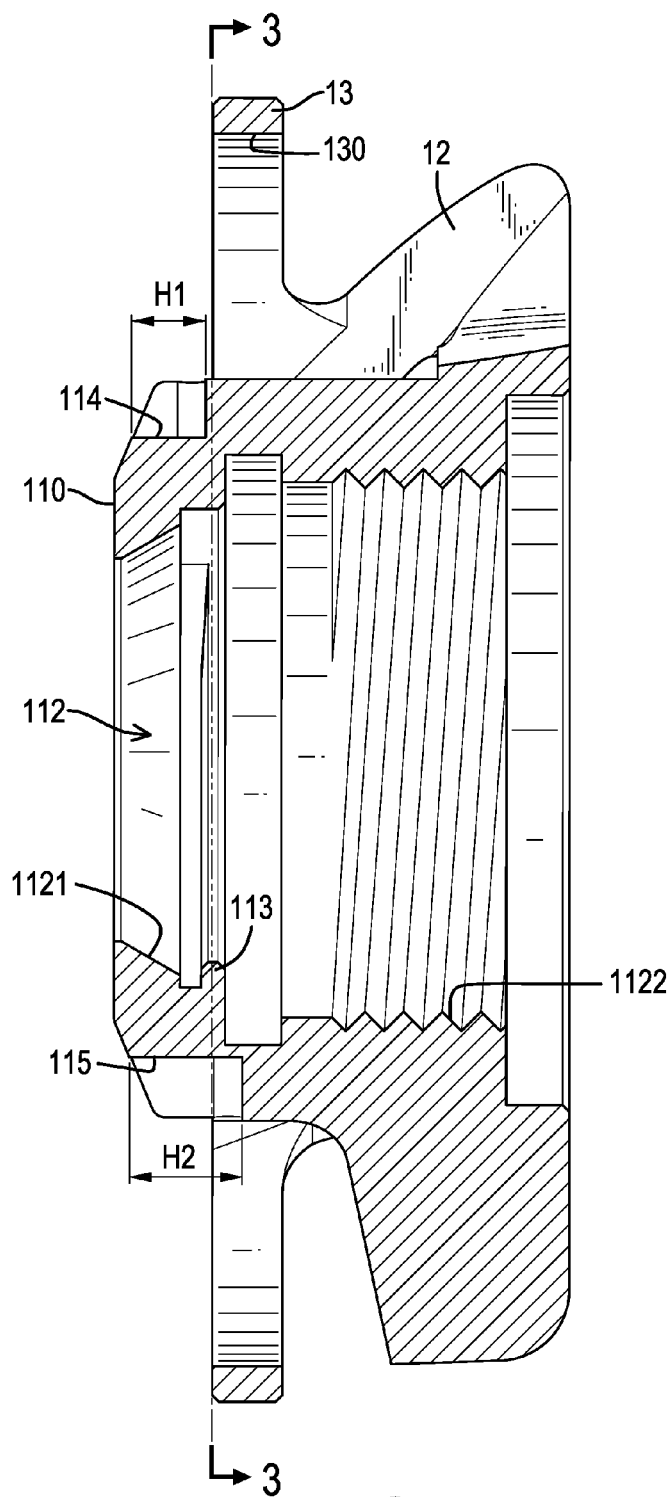
FIG. 4 is a cross sectional side view of the fan screw nut along the line 4-4 in FIG. 3.

With reference to FIGS. 3 and 4, the engaging ring 113 is formed on the inner surface of the assembling hole 112 and is located between the clamping portion 1121 and the screwing portion 1122. Preferably, the engaging ring 113 is formed as a half circle on the inner surface of the assembling hole 112 and an eccentric hole is formed in the assembling hole 112 by the inner surfaces of the assembling hole and the engaging ring 113. The positioning holes 114 are rectangular in cross-section and are formed in a boundary between the front surface 110 and the outer periphery 111 of the screwing hub 11 and arranged around the boundary at intervals. Each positioning hole 114 has a deepness H1. The balancing hole 115 is formed in the in the boundary between the front surface 110 and the outer periphery 111, is located between two of the positioning hole 114, and is located adjacent to the engaging ring 113 of the screwing hub 11. The balancing hole 115 has a deepness H2 that is deeper than the deepness H1 of the positioning holes 114.

Figure 5:
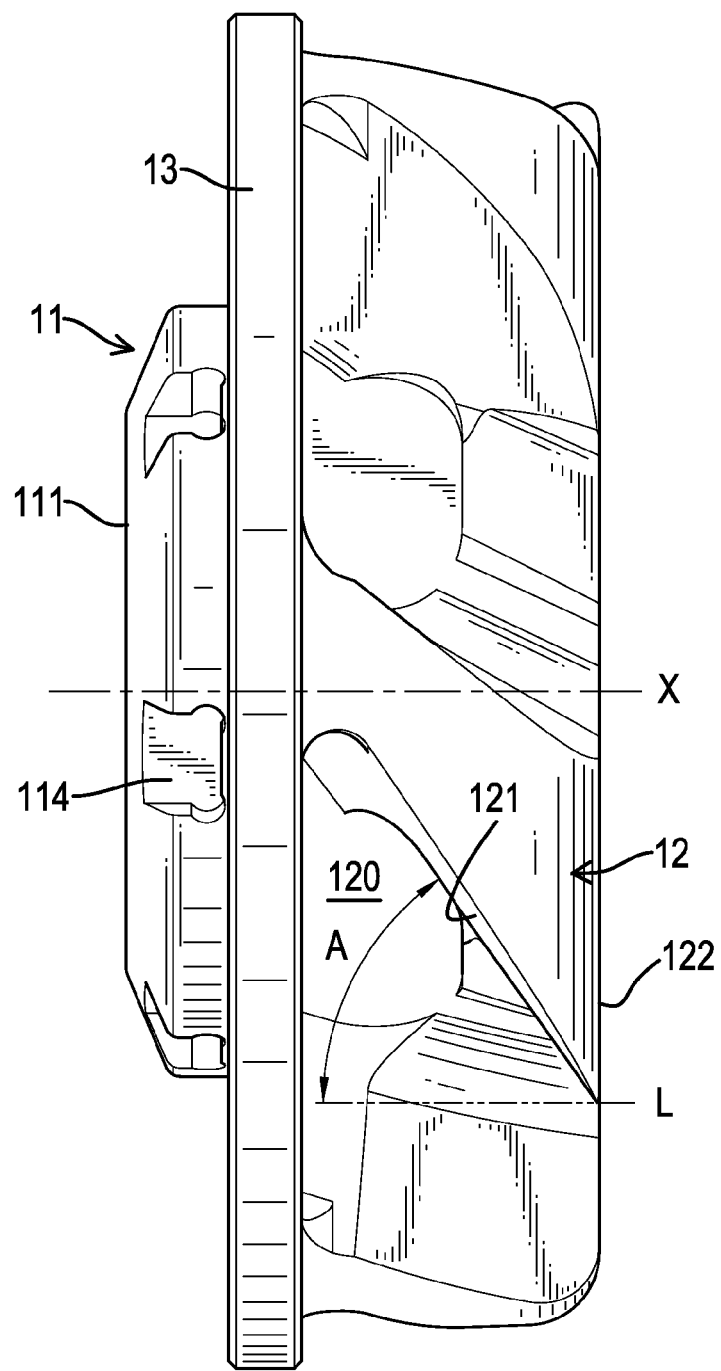
FIG. 5 is a side view of the fan screw nut of FIG. 1.

With reference to FIGS. 1 and 5, the fan blades 12 are spiral in shape and are formed around the outer periphery 111 of the screwing hub 11. A flux space 120 is formed between each adjacent fan blades 12. Each fan blade 12 has an inclined surface 121, a bottom surface 122 and a reference line L which is paralleled to an axial line X of the screwing hub 11 and is perpendicular to the bottom surface 122. An angle A is defined between the inclined surface 121 and the reference line L. The angle range of the angle A of the fan blade 12 is 55 degree to 60 degree; preferably, the angle A is 55 degree.

With reference to FIGS. 1 and 5, the frame 13 is circular and is formed integratedly on an outer periphery of a front side of the fan blades 12. Multiple through holes 130 are formed between the inner side of the frame 13 and the flux spaces 120 for air flowing.

Figure 6:
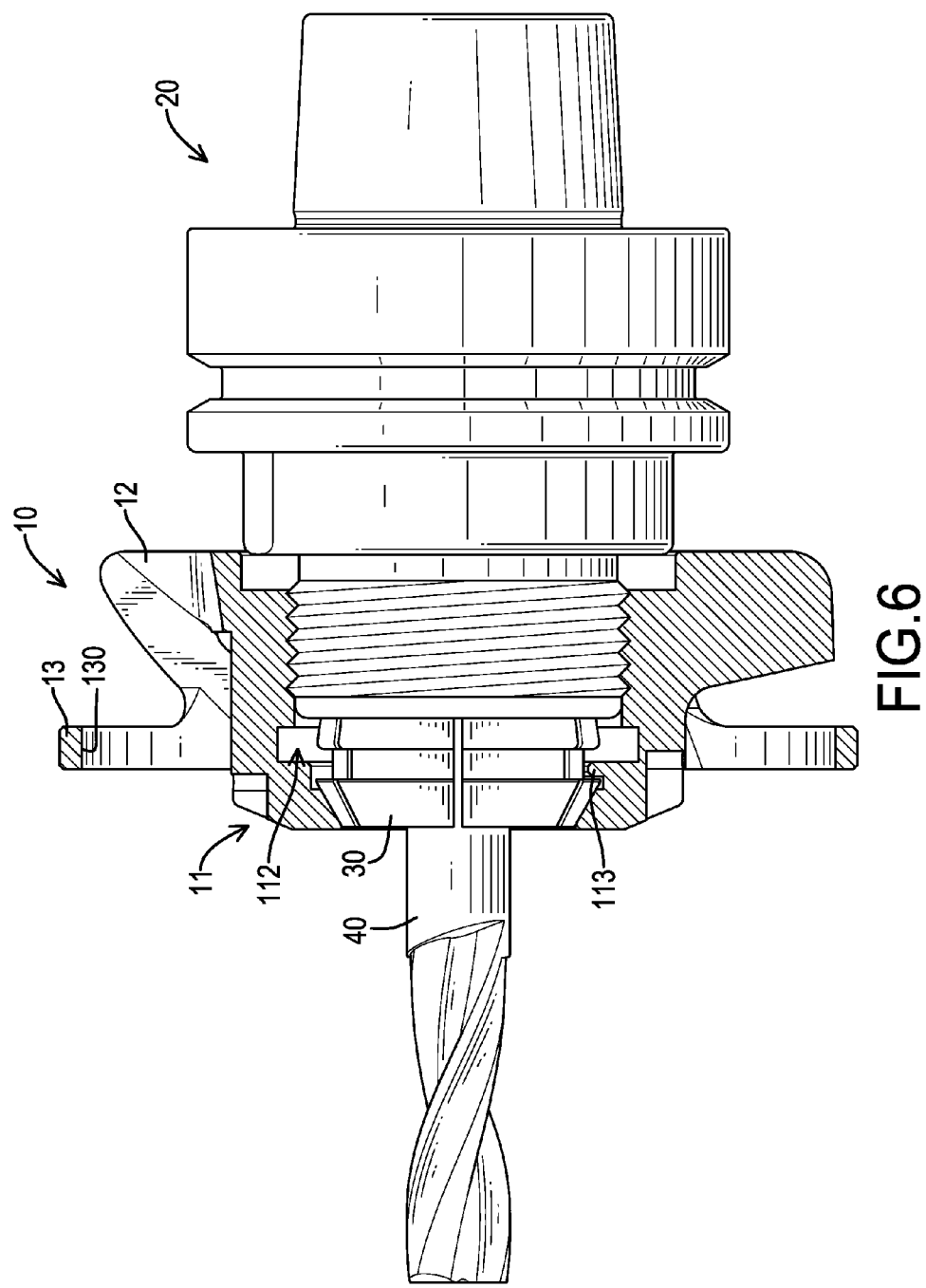
FIG. 6 is an operational top view in partial section of the fan screw nut of FIG. 1 mounted on a tool holder.

With reference to FIG. 6, the fan screw nut 10 is mounted on a tool holder 20 by the screwing portion 1122 of the screwing hub 11 and is eccentrically sleeved around a sleeve 30 by the clamping portion 1121 of the screwing hub 11. A cutting tool 40 is mounted in the sleeve 30 and the fan screw nut 10 can be rotated to clamp or release the cutting tool 40.

With reference to FIG. 4, when the cutting tool 40 is working, the fan screw nut 10 is rotating with the tool holder 20. The air around the fan screw nut 10 is introduced into the flux spaces 120 via the through holes 130 and blows up the scraps that are generated from cutting a work piece. After blowing by the air, the floating scraps can be collected by a collected device (not shown), and the work piece can be cleaned by air generated from the fan screw nut 10.

Furthermore, the volume of the balancing hole 115 is designed for balancing the weight of the engaging ring 113. The deepness H2 of the balancing hole 115 can increase or decrease longitudinally or the width of the balancing hole 115 can increase or decrease horizontally to balance the weight of the engaging ring 113. Additionally, according to the weight of the engaging ring 113, the number of the balancing hole 115 can be added.

Figure 7:
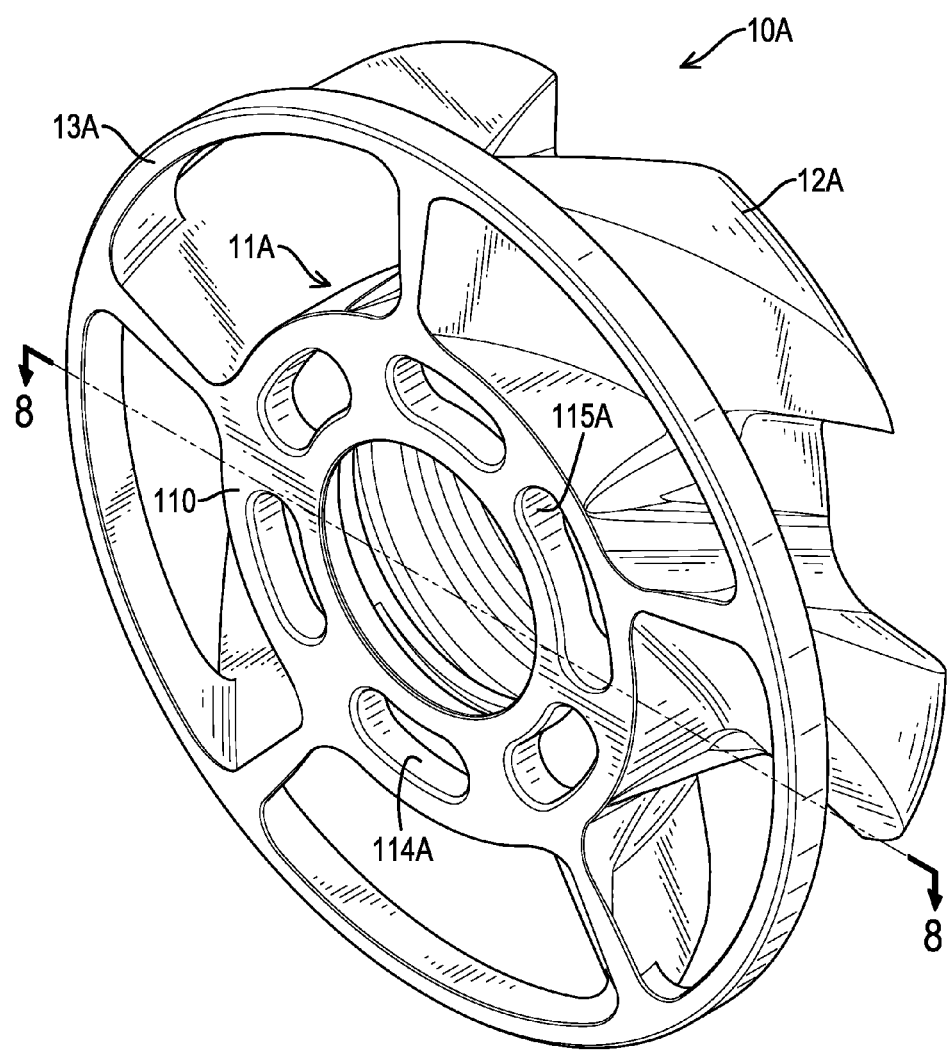
FIG. 7 is a perspective view of a second preferred embodiment of a fan screw nut in accordance with the present invention.
Figure 8:
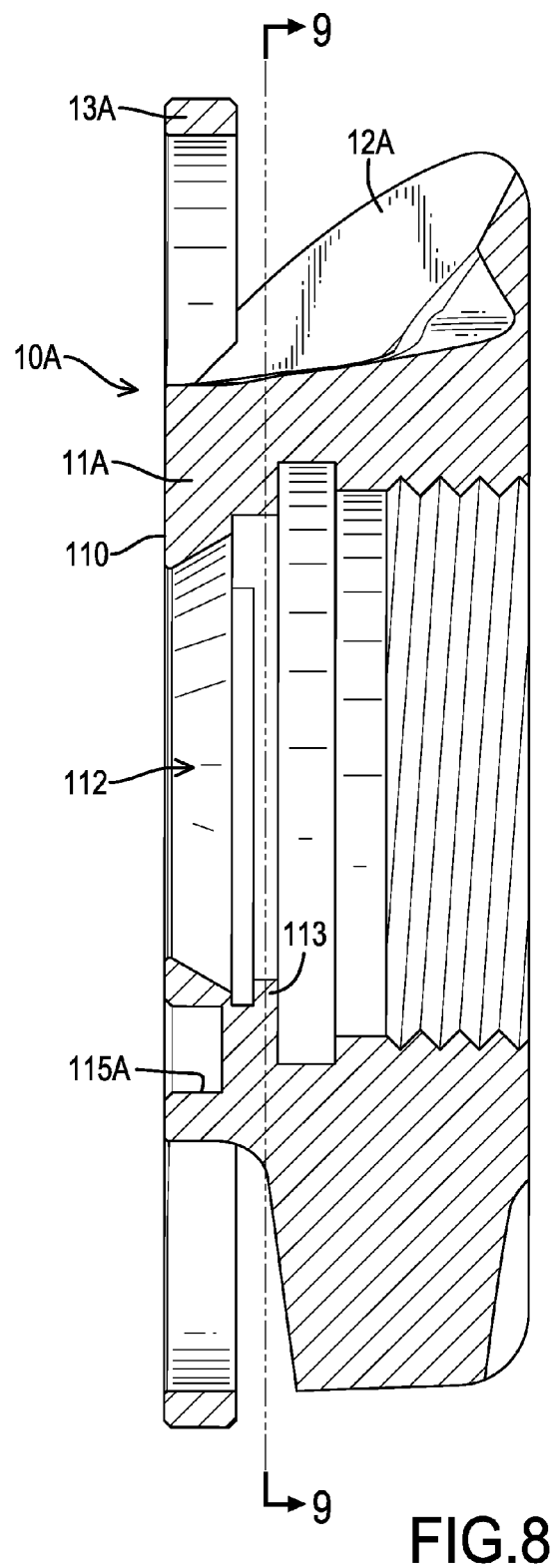
FIG. 8 is a cross sectional side view of the fan screw nut along the line 8-8 in FIG. 7.
Figure 9:
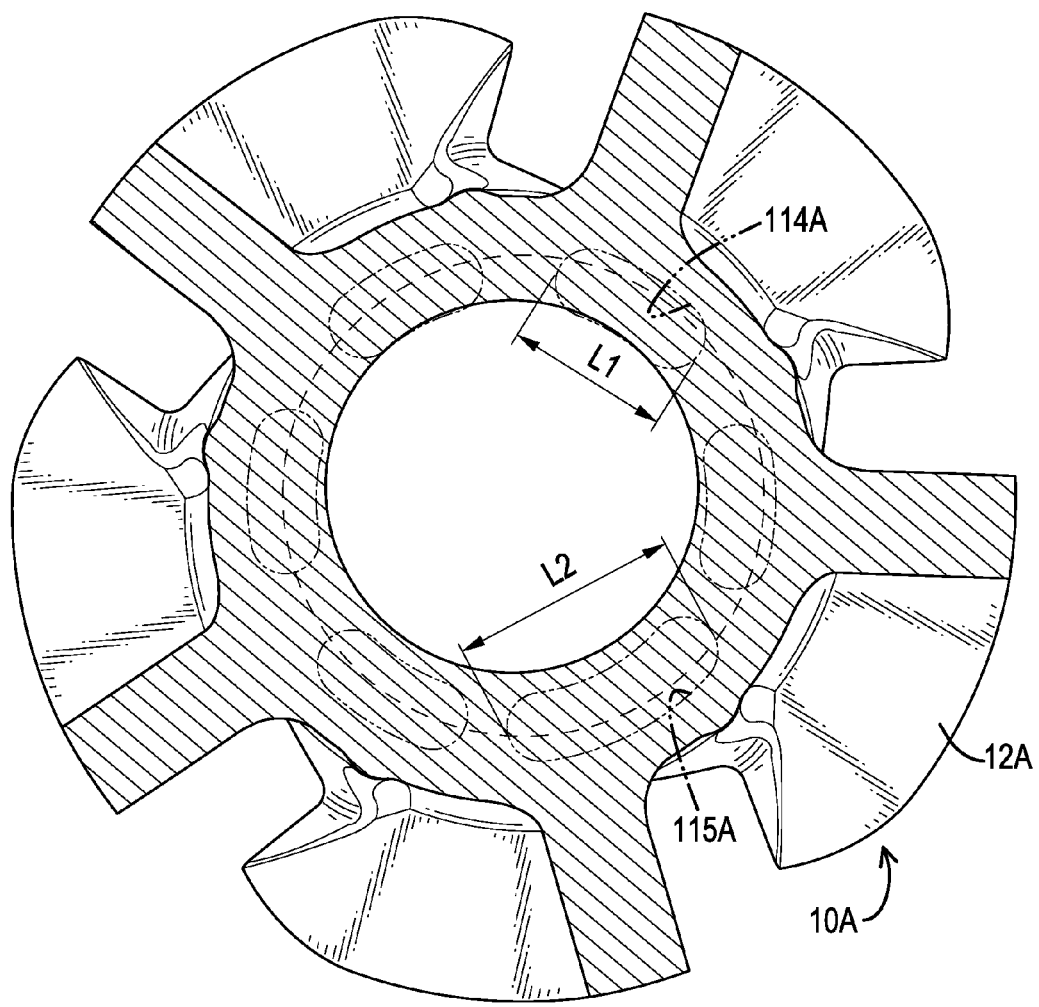
FIG. 9 is a cross sectional front view of the fan screw nut along the line 9-9 in FIG. 8.

With reference to FIGS. 7 to 9, in a second preferred embodiment of the fan screw nut in accordance with the present invention, the elements and effects of the second embodiment are same as those of the first embodiment except the shape of the fan screw nut 10A.

The front surfaces of the fan blades 12A and the front surface of the frame 13A are flush with the front surface 110 of the screwing hub 11. The positioning holes 114 and the balancing hole 115 are arched and arranged as identical intervals. Each positioning hole 114 has length L1 and the balancing hole 115 has length L2 that is longer than length L1 of each positioning hole 114.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan screw nut comprising
a screwing hub being cylindrical and having
  a front surface;
  an outer periphery;
  an assembling hole formed in a center of the front surface and dividend as a clamping portion and a screwing portion, the clamping portion being tapered in cross-section and located adjacent to the front surface, the screwing portion having screw threads formed in an inner surface of the assembling hole;
  an engaging ring formed on the inner surface of the assembling hole and located between the clamping portion and the screwing portion, the engaging ring formed as a half circle on the inner surface of the assembling hole and an eccentric hole formed in the assembling hole by the inner surfaces of the assembling hole and the engaging ring;
  multiple positioning holes and a balancing hole formed in the front surface of the screwing hub at intervals, the balancing hole located adjacent to the engaging ring of the screwing hub;
multiple fan blades being spiral in shaped and formed around the outer periphery of the screwing hub, a flux space formed between each fan blade;
a frame formed integratedly on an outer periphery of a front side of the fan blades, multiple through holes formed between the inner side of the frame and the flux spaces.

2. The fan screw nut as claimed in claim 1, wherein the positioning holes are rectangular in cross-section and are formed in a boundary between the front surface and the outer periphery of the screwing hub.

3. The fan screw nut as claimed in claim 2, wherein each fan blade has an inclined surface, a bottom surface and a reference line is perpendicular to the bottom surface, an angle is defined between the inclined surface and the reference line, the angle range of the angle of each fan blade is 55 degree to 60 degree.

4. The fan screw nut as claimed in claim 3, wherein each positioning hole and the balancing hole respectively have a deepness, the deepness of the balancing hole is deeper than the deepness of each positioning hole.

5. The fan screw nut as claimed in claim 3, wherein each positioning hole and the balancing hole respectively have a length, the length of the balancing hole is longer than the length of each positioning hole.

6. The fan screw nut as claimed in claim 3, wherein the angle of each fan blade is 55 degree.

7. The fan screw nut as claimed in claim 1, wherein the front face of the fan blades and the front face of the frame are flush with the front surface of the screwing hub.

8. The fan screw nut as claimed in claim 7, wherein each fan blade has an inclined surface, a bottom surface and a reference line is perpendicular to the bottom surface, an angle is defined between the inclined surface and the reference line, the angle range of the angle of each fan blade is 55 degree to 60 degree.

9. The fan screw nut as claimed in claim 8, wherein each positioning hole and the balancing hole respectively have a deepness, the deepness of the balancing hole is deeper than the deepness of each positioning hole.

10. The fan screw nut as claimed in claim 8, wherein each positioning hole and the balancing hole respectively have a length, the length of the balancing hole is longer than the length of each positioning hole.

11. The fan screw nut as claimed in claim 8, wherein the angle of each fan blade is 55 degree.

12. The fan screw nut as claimed in claim 7, wherein the positioning holes and the balancing hole are arched and arranged as identical intervals.

13. The fan screw nut as claimed in claim 2, wherein each fan blade has an inclined surface, a bottom surface and a reference line is perpendicular to the bottom surface, an angle is defined between the inclined surface and the reference line, the angle range of the angle of each fan blade is 55 degree to 60 degree.

14. The fan screw nut as claimed in claim 13, wherein each positioning hole and the balancing hole respectively have a deepness, the deepness of the balancing hole is deeper than the deepness of each positioning hole.

15. The fan screw nut as claimed in claim 13, wherein each positioning hole and the balancing hole respectively have a length, the length of the balancing hole is longer than the length of each positioning hole.

16. The fan screw nut as claimed in claim 13, wherein the angle of each fan blade is 55 degree.

17. The fan screw nut as claimed in claim 1, wherein each fan blade has an inclined surface, a bottom surface and a reference line is perpendicular to the bottom surface, an angle is defined between the inclined surface and the reference line, the angle range of the angle of each fan blade is 55 degree to 60 degree.

18. The fan screw nut as claimed in claim 17, wherein each positioning hole and the balancing hole respectively have a deepness, the deepness of the balancing hole is deeper than the deepness of each positioning hole.

19. The fan screw nut as claimed in claim 17, wherein each positioning hole and the balancing hole respectively have a length, the length of the balancing hole is longer than the length of each positioning hole.

20. The fan screw nut as claimed in claim 17, wherein the angle of each fan blade is 55 degree.

* * * * *